United States Patent [19]
Vallillee et al.

[11] Patent Number: 5,457,742
[45] Date of Patent: Oct. 10, 1995

[54] WIRELESS TELEPHONE REMOTE CONTROL SYSTEM

[75] Inventors: George W. Vallillee, Kentwood; James F. MacKay, Grand Rapids, both of Mich.

[73] Assignee: Datalogic Corporation, Grand Rapids, Mich.

[21] Appl. No.: 139,264

[22] Filed: Oct. 18, 1993

[51] Int. Cl.⁶ .................................................. H04M 11/00
[52] U.S. Cl. .............................. 379/352; 355/57; 355/58; 355/61
[58] Field of Search .................................... 379/352, 355, 379/58, 356, 354, 357, 216

[56] References Cited

U.S. PATENT DOCUMENTS

| | | | |
|---|---|---|---|
| 4,125,872 | 11/1978 | Maxwell | 379/355 |
| 4,341,929 | 7/1982 | Alexander et al. | 379/318 |
| 4,543,450 | 9/1985 | Brandt . | |
| 4,661,659 | 4/1987 | Nishimura | 379/99 |
| 4,665,519 | 5/1987 | Kirchner et al. | 370/94 |
| 4,674,111 | 6/1987 | Monet et al. | 379/58 |
| 4,682,357 | 7/1987 | Irino | 379/356 |
| 4,734,931 | 3/1988 | Bourg et al. | 379/93 |
| 4,754,473 | 6/1988 | Edwards | 379/57 |
| 4,868,848 | 9/1989 | Magnusson et al. | 379/355 |
| 4,876,742 | 10/1989 | Vacon et al. | 455/66 |
| 4,908,847 | 3/1990 | Hannon et al. | 379/58 |
| 4,914,688 | 4/1990 | Kobayashi et al. | 379/99 |
| 5,189,632 | 2/1993 | Paajanen et al. | 379/58 |
| 5,276,729 | 1/1994 | Higuchi et al. | 379/355 |

*Primary Examiner*—James L. Dwyer
*Assistant Examiner*—Jacques M. Saint-Surin
*Attorney, Agent, or Firm*—Warner Norcross & Judd

[57] ABSTRACT

A telephone remote control system for direct control of the dialing sequence of a telephone from a personal computer. The remote control system includes an RF transmitter unit mounted on a personal computer and an RF receiver unit within a phone. The transmitter receives dialing commands from a personal computer and transmits those commands to a receiver unit via an RF signal. The receiver unit receives the dialing commands from the transmitter unit and directly controls the dialing sequence of the telephone.

18 Claims, 3 Drawing Sheets

WIRELESS TELEPHONE REMOTE CONTROL SYSTEM

BACKGROUND OF THE INVENTION

The present invention relates to a telephone remote control system.

Computers are often used to maintain extensive data bases which may include records for customers, suppliers, clientele and more. The data bases often store the telephone number(s) of the individuals contained in each of these records. To fully exploit the information stored in these data bases, it is desirable to have the ability to automatically dial the stored telephone numbers directly from the computer. There are a variety of methods for achieving this type of computer autodialing.

First, some telephone manufacturers have provided an RS-232 interface on their telephone work stations for autodialing and other telephone/PC control functions. This method is relatively expensive and the selection of telephones including such an interface is limited.

Second, computer autodialing can be achieved through the use of a modem connected to a dedicated line with an auxiliary single line telephone attached to the modem for voice transmission. This method adds the expense of a dedicated line and results in the inability to use the primary phone and its features.

Third, some computer users have attempted to avoid the need for a dedicated line by purchasing a voice/data switch for manually or automatically switching a single line between voice and digital transmission. Voice/data switches such as "Intelemate II," available from Datalogic Corporation of Grand Rapids, Mich., pass DTMF tones from a modem through the PBX to the telephone company central office. However, it has been found that some PBXs and telephone company central offices are unable to recognize analog DTMF tones for addressing instructions. Further, the cost of a voice/data switch and a modem make this alternative economically undesirable.

Finally, a computer operated system for dialing telephone numbers is disclosed in U.S. Pat. No. 4,868,848 issued Sep. 19, 1989 to Magnusson et al. This system includes a dialing circuit coupled to the printer port of the computer. The dialing circuit provides DTMF dialing signals to an existing telephone line. This system only functions with PBXs and telephone company central offices that recognize analog DTMF tones.

SUMMARY OF THE INVENTION

The aforementioned problems are overcome by the present invention wherein a wireless telephone remote control system provides direct wireless control of the dialing sequence of a telephone from a personal computer. The system includes a transmitter unit to be mounted on a computer and a receiver unit mounted within the controlled phone. The transmitter unit mounts on and receives signals through the serial port of a personal computer. The transmitter unit recognizes standard Hayes "AT" command set instructions and appears to the computer to be a modem. This allows the system to be driven by any of a multitude of autodialing software packages available on the market today. The transmitter unit receives dialing instructions from the computer and forms a data packet including a unique station identifier, the digits to be dialed, and a checksum to validate the data. The data packet is then transmitted using conventional wireless RF technology.

The receiver unit is connected internally to the telephone's main circuit and directly controls the dialing sequence of the telephone while still allowing use of the telephone's manual key pad. The receiver unit receives the data packet transmitted by the transmitter unit, verifies that the data packet is directed to that unit, verifies the integrity of the data packet, and then sends the appropriate dialing sequence to the telephone's main circuit.

In this manner, the present invention provides a simple and effective means for remote control of a telephone from a personal computer without the need for a modem or a dedicated line. The wireless technology used to communicate with the receiver unit eliminates the need for unsightly, unmanageable and restrictive hard wiring. Further, direct control of the existing telephone renders the system compatible with all PBXs and telephone company central offices regardless of whether they recognize DTMF tones. Finally, the system allows full use of the existing telephone's functions and features.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
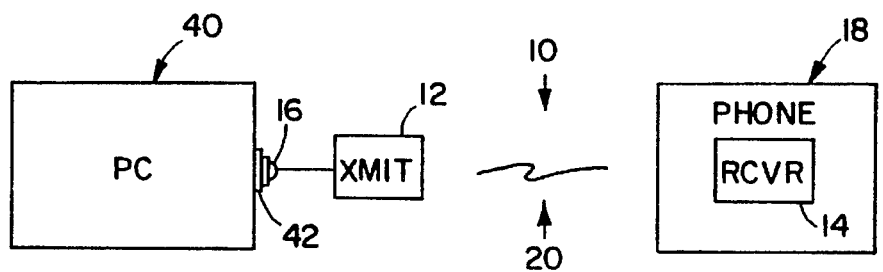
FIG. 1 is a block diagram of the present invention.
Figure 2:
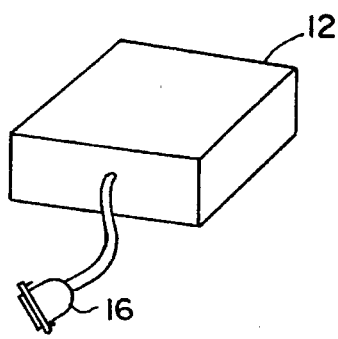
FIG. 2 is a perspective view of a transmitter unit of the present invention.
Figure 3:
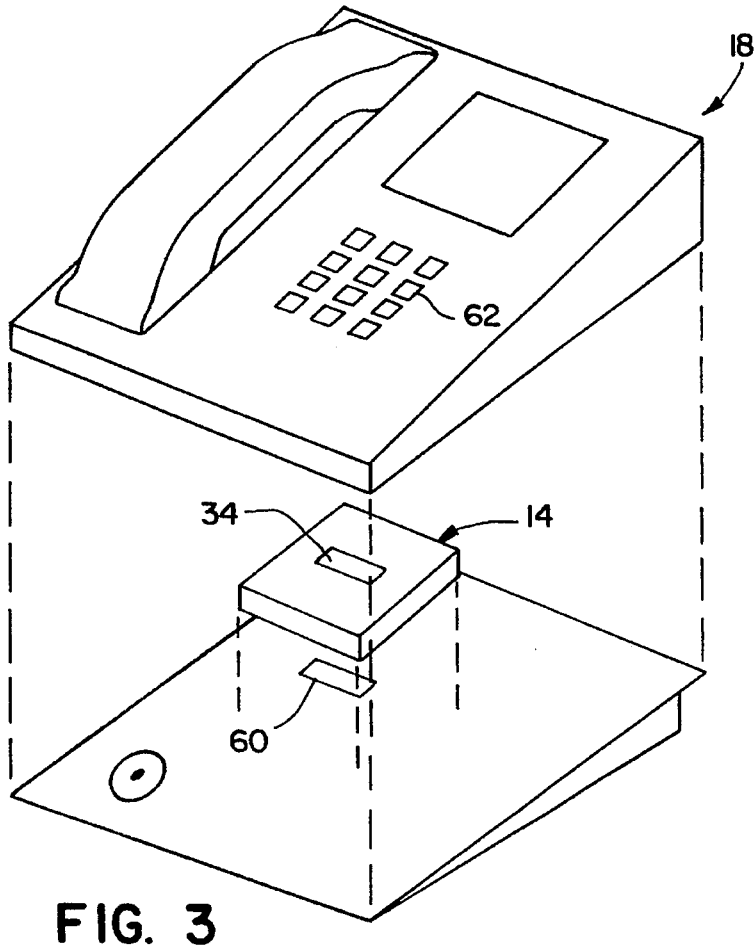
FIG. 3 is an exploded perspective view showing the installation of a receiver unit in a conventional telephone.

The wireless telephone remote control system of the present invention is illustrated in FIG. 1, and generally designated 10. The remote control system includes a transmitter unit 12 and a receiver unit 14, which comprise a pair (see FIGS. 2 and 3). Each transmitter unit 12 and receiver unit 14 pair are assigned matching unique station identifiers which enable remote control commands to be addressed to the proper telephone.

I. Transmitter Unit

Figure 4:
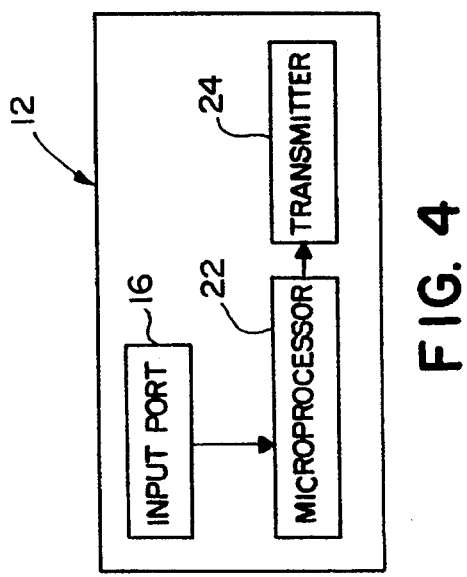
FIG. 4 is a block diagram of a transmitter unit.

As shown in FIG. 4, the transmitter unit 12 generally includes a microprocessor 22, a transmitter 24 and an RS-232 input port 16. The RS-232 input port 16 allows the transmitter unit 12 to interface with a personal computer 40 via a standard RS-232 COM port, such as the computer's serial port 42.

Figure 6:
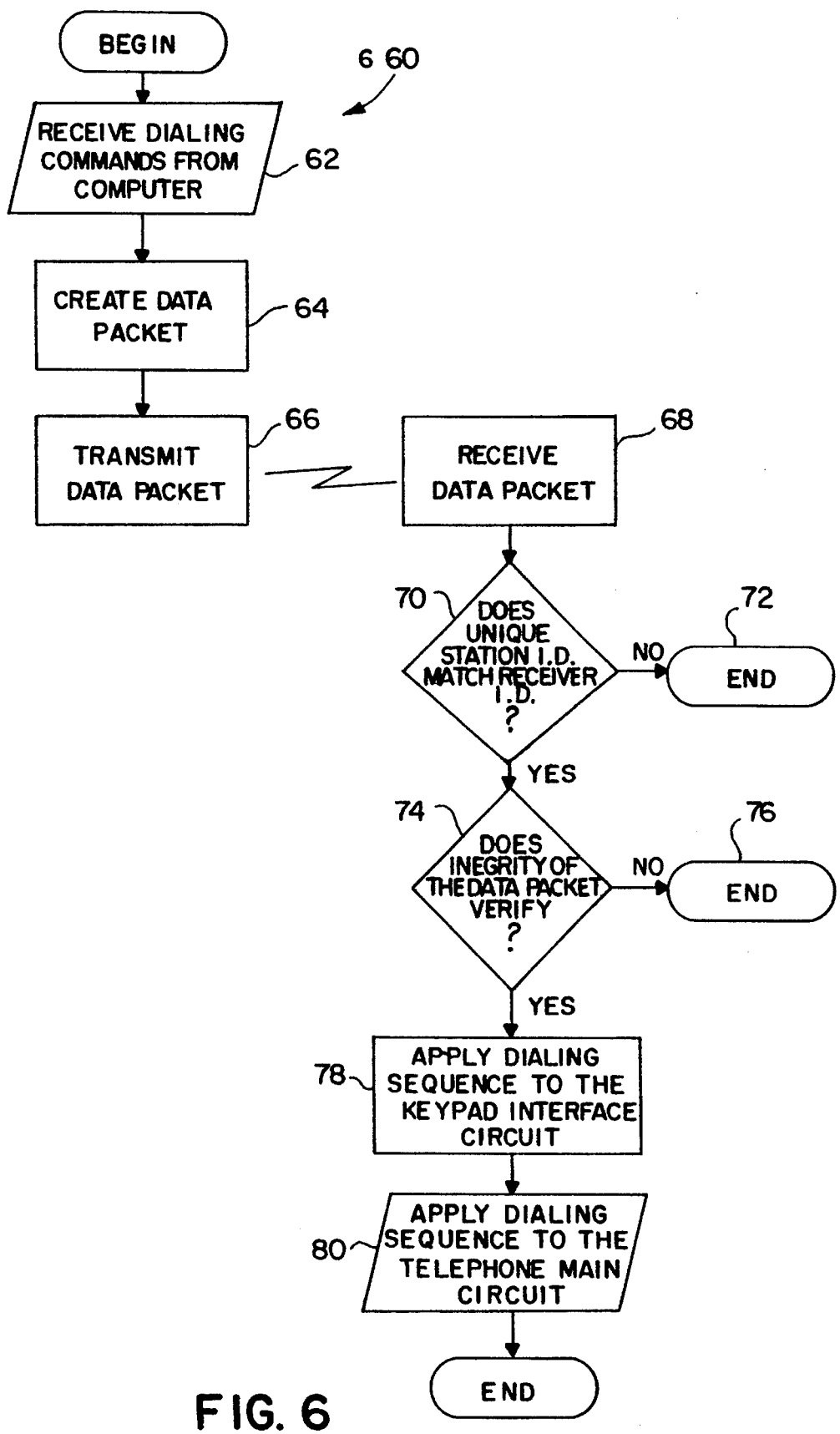
FIG. 6 is a flow chart of the primary steps involved in the present invention.

The microprocessor 22 is interfaced with and receives 62 command instruction from the computer 40 through the RS-232 input port 16 in a manner well known to those skilled in the art (see FIGS. 4 and 6). The microprocessor 22 recognizes standard modem commands and is of a type well known to one skilled in the art. One such microprocessor is the "PIC 16C57" manufactured by Microchip, which is compatible with standard Hayes "AT" code. As a result of the microprocessor's 22 ability to follow standard modem commands, the transmitter unit 12 appears to the computer 40 to be a standard modem. This allows the remote control system 10 to be driven by any commercial modem remote control software that has the ability to communicate with a modem connected to a serial port. After receiving a dialing command from the computer 40, the microprocessor 22 creates 64 a data packet for transmission by the transmitter 24 (see FIG. 6). The data packet includes the digits to be dialed, a unique station identifier, and a checksum. The data packet is created in a manner and format well known to one skilled in the art and its contents will be discussed in more detail below.

Referring to FIGS. 4 and 6, the transmitter 24 receives the data packet from the microprocessor 22 and transmits 66 it using conventional wireless RF (radio frequency) technology. In a preferred embodiment, the transmitter is capable of sending a 310 MHz AM (amplitude modulated) signal. Conventional transmitter circuitry is employed in the present invention and is well known to one skilled in the art. As is readily apparent, a variety of frequencies and/or other wireless technologies can be incorporated into the present invention.

II. Receiver Unit

Figure 5:
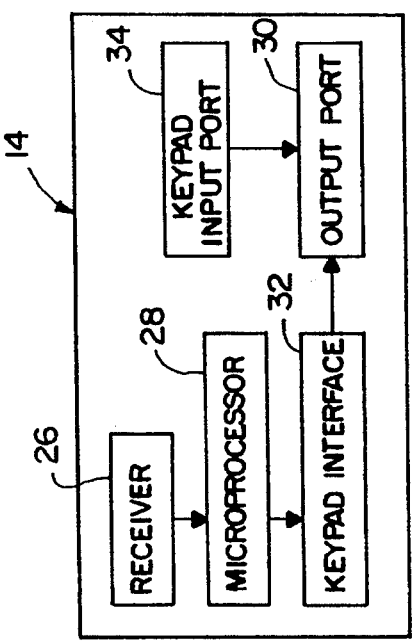
FIG. 5 is a block diagram of a receiver unit.

The receiver unit 14 generally includes a receiver 26, a microprocessor 28, an output port 30, and a keypad interface circuit 32 (see FIG. 5). In an embodiment illustrated in FIG. 3, the receiver unit 14 interfaces with the dialing circuit of a telephone 18 via output port 30. The output port 30 includes a connector which links directly to the manual dial keypad input 60 on the telephone main circuit. The receiver unit 14 further includes a keypad input port 34 for connecting the manual dial keypad 62 to the receiver unit 30. The output port 30 acts as a splitter to allow signals to be passed to the main circuit of the telephone 18 from either the microprocessor 28 or the telephone's manual dial keypad 62. While different telephones will require different connectors or connection techniques, the basic circuitry for each remains the same. The receiver unit 14 can interface with the telephone 18 without connecting directly to the keypad input 60 on the telephone main circuit, for example, through the auxiliary jack increasingly present on phones.

In operation, the receiver 26 receives 68 the data packet transmitted by the transmitter unit 12 (see FIG. 6). In a preferred embodiment, the receiver is capable of receiving a 310 MHz AM signal. However, the frequency and format of the receiver 26 must match that of the transmitter 24. The data packet is converted to digital format and directed to the microprocessor 28. The microprocessor 28 is of a type well known in the art, such as the "PIC 16C57" manufactured by Microchip. The microprocessor 28 verifies that the data packet was addressed to this receiver unit 14 by comparing 70 the unique station identifier included in the data packet with the unique station identifier assigned to the receiver 26. A unique station identifier that does not match that of the receiver unit 14 indicates that the data packet is directed to another receiver unit and the data packet is ignored 72. If the unique station identifiers match, then the microprocessor 28 verifies 74 the integrity of the data packet by comparison to the checksum in a manner well known in the art. If the integrity of the data packet is verified, then the microprocessor 28 applies 78 the dialing sequence contained in the data packet to the keypad interface circuit 32. The keypad interface circuit 32 in turn applies 80 the dialing sequence to the main circuit of the telephone 18 through output port 30.

Figure 7:
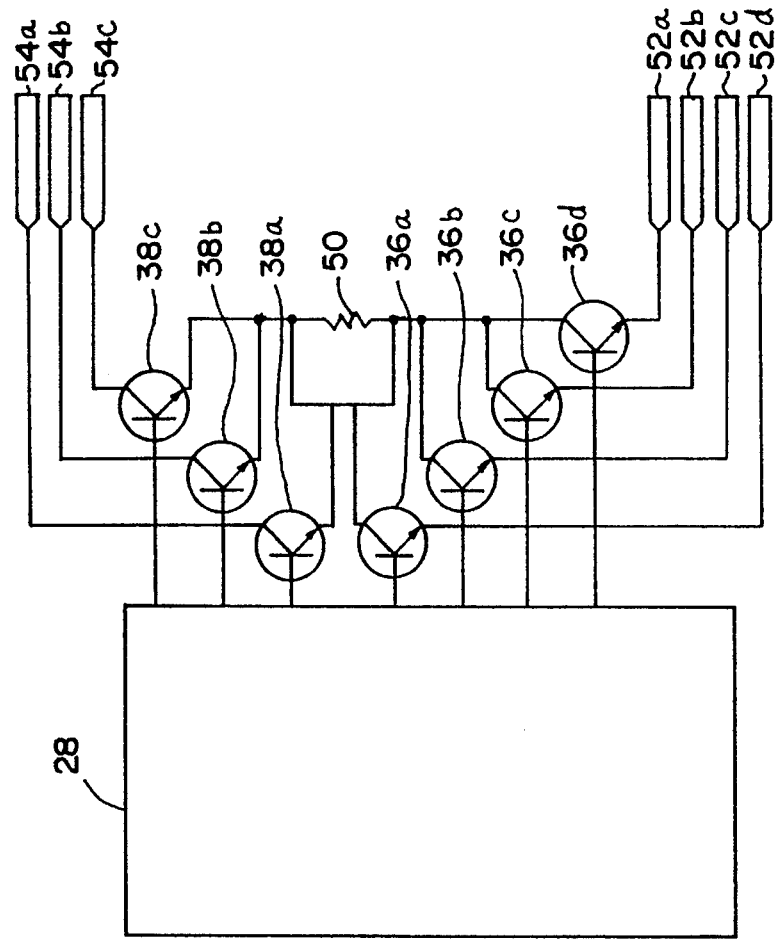
FIG. 7 is a schematic diagram of the keypad interface circuit.

The keypad interface circuit 32 is illustrated in FIG. 7, and generally includes a load 50, a series of row transistors 36a–d, a series of column transistors 38a–c, and a series of row 52a–d and column 54a–c commons. The circuit 32 is designed to directly control the dialing sequence of the telephone by emulating the manual depression of a key on the telephone keypad 62. In +!#ventional telephone circuitry, each key is assigned a distinct row and column designation. The telephone main circuit recognizes the depression of a key by scanning each possible row/column pair on the manual dial keypad input 60 for a particular load. Once the telephone main circuit recognizes the load across any row/column pair, the telephone performs the function associated with the key assigned to the row and column bearing the load. For example, a conventional telephone keypad includes the digits 0–9, an asterisk ("*") and a pound sign ("#"). This allows the entire array of twelve keys to be represented in a three-by-four matrix with each key being assigned a distinct row and column designation. Suppose, only for purposes of this example, that the digit six ("6") has been assigned a row designation of three and a column designation of two. The telephone main circuit will recognize that the digit six has been depressed when the appropriate load is applied across the row three and column two commons.

To emulate the manual depression of a key, the keypad interface circuit 32 applies a load 50 across the appropriate row 52a–d and column 54a–c commons of the manual dial keypad input 60 on the telephone main circuit. The load 50 is preferably selected to match the resistance of the type of switch incorporated into the telephone keypad 62, such as a membrane switch. The keypad interface circuit 32 is designed to mimic the row/column key designations that are recognized by the telephone 18. The specific number and arrangement of rows and columns of transistors will vary depending on the number of keys to be emulated and the row/column designations recognized by the particular telephone. However, the basic circuitry remains essentially the same for each telephone.

In the present embodiment, the circuit 32 includes four row transistors 36a–d and three column transistors 38a–c (see FIG. 7). The circuit 32 functions by activating the row transistor 36a–d and the column transistor 38a–c which correspond to the key to be emulated. The activation of both transistors, results in load 50 being applied across the commons for the corresponding row and column. The telephone circuitry recognizes this load 50 by row 52a–d and column 54a–c number and reacts as though the corresponding key was manually pressed. The receiver unit 14 sequentially emulates the manual depression of each key contained in the dialing sequence received from the transmitter unit 12. In this manner, any number or sequence of keys can be automatically entered into the telephone main circuit including non-numeric keys such as speed dialing, speaker phone, and transfer.

The above description is that of a preferred embodiment of the invention. Various alterations and changes can be made without departing from the spirit and broader aspects of the invention as defined in the claims, which are to be interpreted in accordance with the principles of patent law, including the doctrine of equivalents.

The embodiments of the invention in which an exclusive property or privilege is claimed are defined as follows:

1. A telephone remote control system for directly controlling the dialing sequence of a telephone from a computer, the telephone including keys and circuitry, said control system comprising:

a transmitter unit including:

connector means for mechanically connecting said transmitter unit to a communications port of the computer, input means for receiving dialing commands from the computer, and transmitter means for transmitting the dialing commands from said transmitter unit using wireless communication technology; and a receiver unit including:

connector means for electrically connecting said receiver unit to the circuitry of the telephone, receiver means for receiving said dialing commands transmitted by said transmitter unit, and control means for directly causing the telephone circuitry to execute the dialing commands by emulating manual operation of the telephone keys automatically in response to receiving the dialing commands.

2. The telephone remote control system of claim 1, wherein said wireless communication technology is radio frequency technology.

3. The telephone remote control system of claim 2, wherein said transmitter unit input means includes an RS-232 input port.

4. The telephone remote control system of claim 3, wherein the dialing commands follow a standard modem command instruction set.

5. The telephone remote control system of claim 4, wherein said transmitter means further includes means for transmitting a unique station identifier along with the dialing commands, said receiver means further including means for receiving the unique station identifier, and said receiver unit further including a receiver unit identifier and means for ignoring the dialing commands transmitted by said transmitter unit unless the unique station identifier transmitted along with the dialing commands matches the receiver unit identifier.

6. The telephone remote control system of claim 5, wherein said transmitter means further includes means for transmitting a checksum along with the unique station identifier and the dialing commands, said receiver means further including means for receiving the checksum, and said receiver unit further including means for checking the integrity of the dialing commands by verification of the checksum.

7. The telephone remote control system of claim 6, wherein the telephone includes a keypad and a keypad input jack, wherein said receiver unit control means includes means for interfacing said receiver unit with the telephone keypad input jack, wherein said receiver unit emulates the manual operation of the telephone keypad.

8. The telephone remote control system of claim 7, wherein said receiver unit further includes a keypad bypass means for connecting the telephone keypad to the telephone keypad input jack through said receiver unit, thereby allowing the telephone to receive dialing commands either remotely through said receiver unit or directly through said telephone keypad.

9. A telephone remote control system for directly controlling the dialing sequence of a telephone from a computer, wherein the computer includes a communications port, wherein the telephone includes a main circuit, a keypad, a keypad input jack, and a receiver for receiving incoming transmissions over a telephone connection, said system comprising:

a transmitter unit including:

connector means for mechanically connecting said transmitter unit to the communications port of the computer, input means for receiving dialing commands from the computer, transmitter control means for creating a data packet including the dialing commands, a unique station identifier, and a checksum, and transmitter means for transmitting the data packet using wireless communication technology; and a receiver unit separate from the receiver of the telephone, said receiver unit including:

connector means for connecting said receiver unit to the telephone, receiver means for receiving the data packet transmitted by said transmitter unit, and receiver control means for ignoring said data packet unless the station identifier transmitted therein matches a unique station identifier assigned to said receiver unit, for checking the integrity of the data packet by verification of the checksum of the data packet, and for directly causing the main circuit to execute the dialing sequence immediately in response to receiving an assigned, verified data packet.

10. The telephone remote control system of claim 9, wherein said wireless communication technology is radio frequency technology.

11. The telephone remote control system of claim 10, wherein said transmitter unit input means includes an RS-232 input port.

12. The telephone remote control system of claim 11, wherein the dialing commands follow a standard modem command instruction set.

13. The telephone remote control system of claim 12, wherein said receiver unit interfaces directly with the telephone main circuit.

14. The telephone remote control system of claim 11, wherein said receiver unit control means includes means for interfacing said receiver unit with the telephone keypad input jack, wherein said receiver unit emulates the manual operation of the telephone keypad.

15. The telephone remote control system of claim 14, wherein said receiver unit further includes a keypad bypass means for connecting the telephone keypad to the telephone keypad input jack through said receiver unit, thereby allowing the telephone to receive dialing commands either remotely through said receiver unit or directly through said telephone keypad.

16. A computer controlled phone dialing system comprising:

a transmitter unit including connector means for operatively connecting said transmitter unit to a communications port on a computer, receiving means connected to said connector means for receiving information indicative of a telephone number to be dialed, and transmitter means for transmitting the information via a wireless signal; and a receiver unit including connector means for operatively connecting said receiver unit to the internal circuitry of a telephone, receiving means for receiving the wireless signal and embodied information transmitted by said transmitter unit, and control means responsive to the information for issuing dialing commands to the telephone circuitry by electrically emulating the manual operation of the telephone's keys causing the circuitry to dial the telephone number.

17. The computer controlled phone dialing system of claim 16 wherein:

each of said transmitter unit and said receiver unit are assigned the same unique station identifier;
the RF signal includes the unique identifier; and
said control means within said receiver unit includes means for ignoring any RF signal not containing the unique identifier, whereby said receiver unit is responsive only to said transmitter unit in an environment where multiple transmitter units may be present.

18. The computer controlled phone dialing system of claim 16 wherein said receiver unit is adapted to be connected between the keypad connector and the keypad jack of the telephone, whereby the phone can be dialed using either remotely through said computer controlled phone dialing system or directly through the telephone keypad.

* * * * *